(12) United States Patent
Nishio et al.

(10) Patent No.: US 12,456,752 B2
(45) Date of Patent: *Oct. 28, 2025

(54) SOLID ELECTROLYTE COMPOSITION, AND METHOD FOR MANUFACTURING SOLID ELECTROLYTE MEMBER

(71) Applicant: Panasonic Intellectual Property Management Co., Ltd., Osaka (JP)

(72) Inventors: Yusuke Nishio, Osaka (JP); Seiji Nishiyama, Osaka (JP); Yoshiaki Tanaka, Kyoto (JP); Akinobu Miyazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 751 days.

This patent is subject to a terminal disclaimer.

(21) Appl. No.: 17/831,097

(22) Filed: Jun. 2, 2022

(65) Prior Publication Data

US 2022/0294012 A1    Sep. 15, 2022

Related U.S. Application Data

(63) Continuation of application No. PCT/JP2020/045913, filed on Dec. 9, 2020.

(30) Foreign Application Priority Data

Dec. 12, 2019    (JP) .................................. 2019-224856

(51) Int. Cl.
*H01M 10/0562*   (2010.01)
*C01B 11/18*     (2006.01)
*H01M 10/052*    (2010.01)

(52) U.S. Cl.
CPC ......... *H01M 10/0562* (2013.01); *C01B 11/18* (2013.01); *H01M 10/052* (2013.01); *C01P 2006/40* (2013.01); *H01M 2300/0071* (2013.01); *H01M 2300/008* (2013.01); *H01M 2300/0091* (2013.01)

(58) Field of Classification Search
None
See application file for complete search history.

(56) References Cited

U.S. PATENT DOCUMENTS

| | | | | |
|---|---|---|---|---|
| 4,977,007 A | * | 12/1990 | Kondo | H01M 4/02 428/209 |
| 5,190,695 A | | 3/1993 | Sotomura | |
| 2004/0151986 A1 | * | 8/2004 | Park | H01M 10/0436 501/134 |
| 2015/0380765 A1 | * | 12/2015 | Fujieda | H01M 10/052 429/304 |
| 2019/0074542 A1 | | 3/2019 | Makino et al. | |
| 2019/0386322 A1 | | 12/2019 | Yawata et al. | |
| 2021/0013542 A1 | | 1/2021 | Takahashi et al. | |
| 2021/0242494 A1 | | 8/2021 | Tanaka et al. | |
| 2021/0249683 A1 | * | 8/2021 | Tanaka | C01G 33/00 |
| 2021/0280905 A1 | * | 9/2021 | Sakaida | H01B 1/08 |
| 2021/0296692 A1 | * | 9/2021 | Ueno | H01M 4/62 |
| 2021/0296693 A1 | * | 9/2021 | Nishio | H01B 13/00 |
| 2022/0102753 A1 | | 3/2022 | Tanaka et al. | |
| 2022/0209287 A1 | * | 6/2022 | Tanaka | H01M 10/052 |
| 2023/0307704 A1 | * | 9/2023 | Tanaka | H01M 10/052 |
| 2024/0051841 A1 | * | 2/2024 | Kubo | C01G 35/02 |
| 2024/0413393 A1 | * | 12/2024 | Tanaka | H01M 4/13 |
| 2024/0413394 A1 | * | 12/2024 | Tanaka | H01B 1/08 |
| 2025/0015348 A1 | * | 1/2025 | Kubo | H01M 4/62 |
| 2025/0023095 A1 | * | 1/2025 | Kubo | H01M 4/13 |
| 2025/0030045 A1 | * | 1/2025 | Kubo | C01G 35/02 |

FOREIGN PATENT DOCUMENTS

| | | |
|---|---|---|
| EP | 3905269 A1 | 11/2021 |
| EP | 3905272 A1 | 11/2021 |
| EP | 3905277 A1 | 11/2021 |
| EP | 3993108 A1 | 5/2022 |
| EP | 4084120 A1 | 11/2022 |
| EP | 4084180 A1 | 11/2022 |
| JP | 2006-156284 A | 6/2006 |
| JP | 2016-139511 A | 8/2016 |
| WO | 2018/168505 A1 | 9/2018 |
| WO | 2019/176895 A1 | 9/2019 |
| WO | 2020/137153 A1 | 7/2020 |
| WO | 2020/137155 A1 | 7/2020 |
| WO | 2020/137189 A1 | 7/2020 |
| WO | 2021/002064 A1 | 1/2021 |

(Continued)

OTHER PUBLICATIONS

Machine translation of JP 2006-156284, published on Jun. 15, 2006 (Year: 2006).*
International Search Report issued on Feb. 2, 2021 in International Patent Application No. PCT/JP2020/045913, with English translation.
Extended European Search Report issued in corresponding European Patent Application No. 20898889.9, dated Jan. 9, 2023.
International Search Report issued on Mar. 8, 2022 in International Patent Application No. PCT/JP2021/048646, with English translation.

(Continued)

*Primary Examiner* — Anca Eoff
(74) *Attorney, Agent, or Firm* — Rimon P.C.

(57) ABSTRACT

A solid electrolyte composition of the present disclosure includes: a solid electrolyte material including an oxygen element and a halogen element; and an organic solvent. The organic solvent includes at least one selected from the group consisting of a halogen-group-containing compound and a hydrocarbon. The solid electrolyte material includes at least one selected from the group consisting of Zn, Sn, Al, Sc, Ga, Bi, Sb, Zr, Hf, Ti, Ta, Nb, W, Y, Gd, Tb, and Sm.

11 Claims, 3 Drawing Sheets

(56) References Cited

FOREIGN PATENT DOCUMENTS

WO 2021/261361 A1 12/2021

OTHER PUBLICATIONS

Extended European Search Report dated Sep. 18, 2024 issued in the corresponding European Patent Application No. 21937987.2.

* cited by examiner

SOLID ELECTROLYTE COMPOSITION, AND METHOD FOR MANUFACTURING SOLID ELECTROLYTE MEMBER

This application is a continuation of PCT/JP2020/045913 filed on Dec. 9, 2020, which claims foreign priority of Japanese Patent Application No. 2019-224856 filed on Dec. 12, 2019, the entire contents of both of which are incorporated herein by reference.

BACKGROUND OF THE INVENTION

1. Field of the Invention

The present disclosure relates to a solid electrolyte composition used, for example, for manufacturing all-solid-state batteries and to a method for manufacturing a solid electrolyte member.

2. Description of Related Art

WO 2018/168505 discloses a solid electrolyte composition using a sulfide solid electrolyte.

SUMMARY OF THE INVENTION

In conventional techniques, there has been a desire for suppressing a decrease in ionic conductivity of solid electrolyte materials.

One aspect of the present disclosure relates to a solid electrolyte composition including:
 a solid electrolyte material including an oxygen element and a halogen element; and
 an organic solvent, wherein
 the organic solvent includes at least one selected from the group consisting of a halogen-group-containing compound and a hydrocarbon, and
 the solid electrolyte material includes at least one selected from the group consisting of Zn, Sn, Al, Sc, Ga, Bi, Sb, Zr, Hf, Ti, Ta, Nb, W, Y, Gd, Tb, and Sm.

Another aspect of the present disclosure relates to a method for manufacturing a solid electrolyte member, the method including
 removing the organic solvent from the above solid electrolyte composition.

According to the present disclosure, it is possible to provide a solid electrolyte composition in which a decrease in ionic conductivity of a solid electrolyte material can be suppressed and a method for manufacturing a solid electrolyte member using the same.

DETAILED DESCRIPTION

Figure 1:
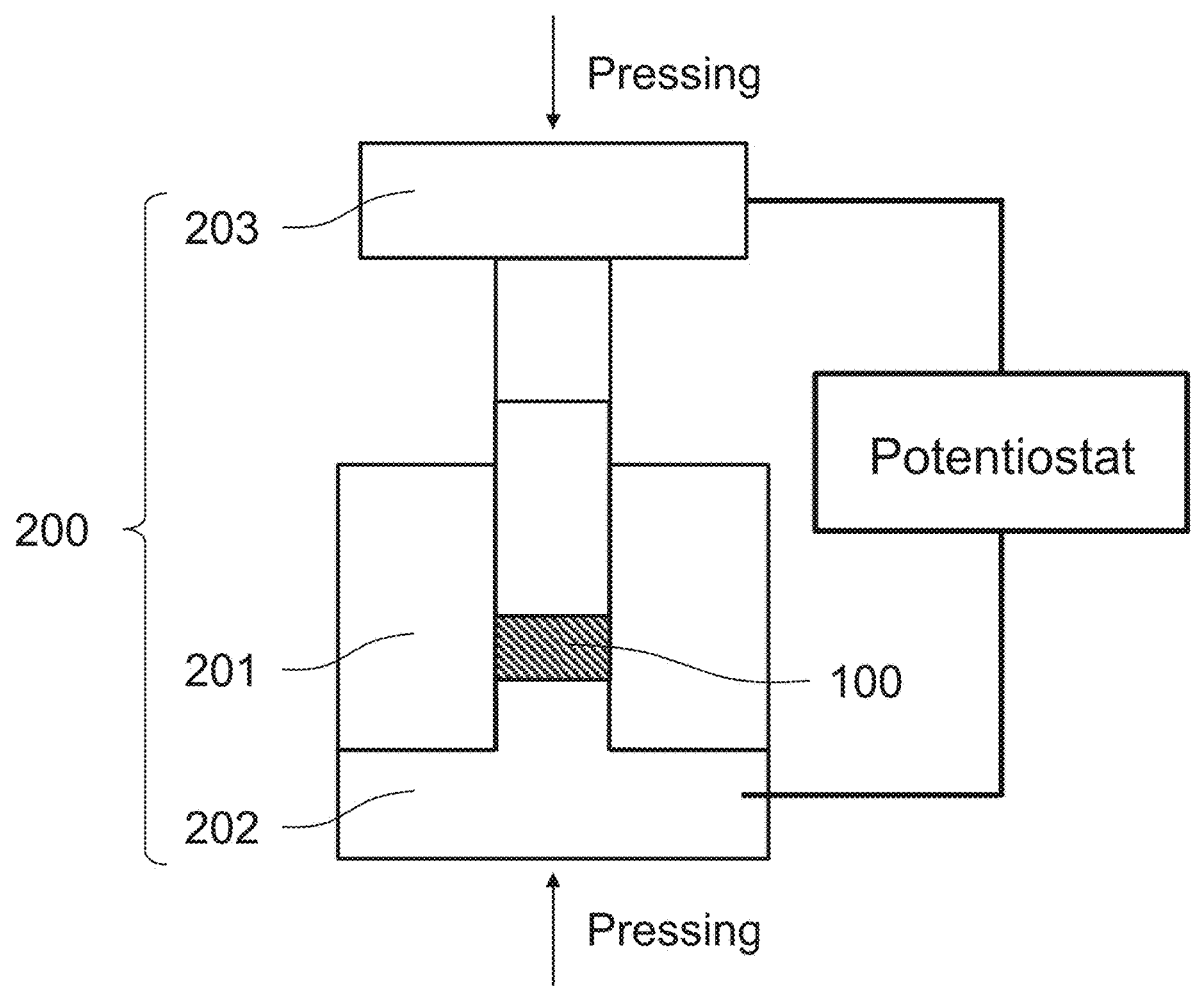
FIG. 1 is a schematic diagram showing a method for evaluating the lithium ion conductivity of a solid electrolyte material.

Outline of One Aspect of the Present Disclosure

A solid electrolyte composition according to a first aspect of the present disclosure includes:
 a solid electrolyte material including an oxygen element and a halogen element; and
 an organic solvent, wherein
 the organic solvent includes at least one selected from the group consisting of a halogen-group-containing compound and a hydrocarbon, and
 the solid electrolyte material includes at least one selected from the group consisting of Zn, Sn, Al, Sc, Ga, Bi, Sb, Zr, Hf, Ti, Ta, Nb, W, Y, Gd, Tb, and Sm.

According to the first aspect, a decrease in ionic conductivity of the solid electrolyte material can be suppressed.

In a second aspect of the present disclosure, for example, in the solid electrolyte composition according to the first aspect, the solid electrolyte material may have lithium ion conductivity, and may include at least one selected from the group consisting of F, Cl, Br, and I.

In a third aspect of the present disclosure, for example, in the solid electrolyte composition according to the first aspect, the solid electrolyte material may include: Li; O; at least one selected from the group consisting of Ta and Nb; and at least one selected from the group consisting of F, Cl, Br, and I.

In a fourth aspect of the present disclosure, for example, in the solid electrolyte composition according to the third aspect, the solid electrolyte material may include at least one selected from the group consisting of a material including Li, Ta, O, and Cl, a material including Li, Nb, O, and Cl, and a material including Li, Ta, Nb, O, and Cl.

In a fifth aspect of the present disclosure, for example, in the solid electrolyte composition according to the fourth aspect, the solid electrolyte material may include Li, O, M, and Cl, the M may include at least one selected from the group consisting of Ta and Nb, a ratio of the number of moles of O to the number of moles of Cl may be 0.16 or more and 0.35 or less, and a ratio of the number of moles of Li to the number of moles of M may be 0.6 or more and 2.4 or less.

In a sixth aspect of the present disclosure, for example, in the solid electrolyte composition according to the fifth aspect, the solid electrolyte material may include at least one selected from the group consisting of $LiTaOCl_4$, $LiNbOCl_4$, and $LiTa_{0.9}Nb_{0.1}OCl_4$.

According to the second to sixth aspects, a decrease in ionic conductivity of the solid electrolyte material can be suppressed.

In a seventh aspect of the present disclosure, for example, in the solid electrolyte composition according to any one of the first to sixth aspects, the halogen-group-containing compound may contain only a halogen group as a functional group. With such a structure, it is possible to obtain a solid electrolyte composition with an excellent suspension stability of a solid electrolyte material.

In an eighth aspect of the present disclosure, for example, in the solid electrolyte composition according to any one of the first to seventh aspects, the organic solvent may have a cyclic structure.

In a ninth aspect of the present disclosure, for example, in the solid electrolyte composition according to the eighth aspect, the organic solvent may include an aromatic compound.

According to the eighth and ninth aspects, an oxyhalide solid electrolyte material can be easily dispersed in the organic solvent.

In a tenth aspect of the present disclosure, for example, in the solid electrolyte composition according to any one of the first to seventh aspects, the organic solvent may include at least one selected from the group consisting of tetralin, ethylbenzene, mesitylene, pseudocumene, xylene, cumene, 1,2,4-trichlorobenzene, chlorobenzene, 2,4-dichlorobenzene, o-chlorotoluene, 1,3-dichlorobenzene, p-chlorotoluene, 1,2-dichlorobenzene, 1,4-dichlorobutane, 2,4-dichlorotoluene, and 3,4-dichlorotoluene.

In an eleventh aspect of the present disclosure, for example, in the solid electrolyte composition according to any one of the first to seventh aspects, the organic solvent may include at least one selected from the group consisting of tetralin, mesitylene, xylene, cumene, o-chlorotoluene, p-chlorotoluene, 1,4-dichlorobutane, 2,4-dichlorotoluene, and 3,4-dichlorotoluene.

According to the tenth and eleventh aspects, the oxyhalide solid electrolyte material can be easily dispersed in the organic solvent.

According to a twelfth aspect of the present disclosure, for example, in the solid electrolyte composition according to any one of the first to eleventh aspects, the solid electrolyte material may be substantially free of a sulfur element. According to the twelfth aspect, a decrease in ionic conductivity of the solid electrolyte material can be more reliably suppressed.

A method for manufacturing a solid electrolyte member according to a thirteenth aspect of the present disclosure includes removing the organic solvent from the solid electrolyte composition according to any one of the first to twelfth aspects.

According to the thirteenth aspect, a homogeneous solid electrolyte membrane can be manufactured.

In a fourteenth aspect of the present disclosure, for example, in the method for manufacturing a solid electrolyte member according to the thirteenth aspect, the organic solvent may be removed by drying under reduced pressure. With such a structure, a coating film having a uniform thickness can be formed.

Embodiments of the present invention will be described with reference to the drawings.

<Inventors' Viewpoint>

In the field of secondary batteries for which a higher energy density and a higher capacity are needed, organic electrolyte solutions, in which an electrolyte salt is dissolved in an organic solvent, have been used conventionally and predominantly. In secondary batteries using organic electrolyte solutions, liquid leakage is a concern, and a possible increase in amount of heat generated in case of a short circuit or the like is also pointed out.

Meanwhile, all-solid-state secondary batteries using an inorganic solid electrolyte instead of an organic electrolyte solution are increasingly drawing attention. All-solid-state secondary batteries cause no liquid leakage. Since inorganic solid electrolytes are nonflammable, heat generation in case of a short circuit or the like is expected to be suppressed.

As inorganic solid electrolytes used for all-solid-state secondary batteries, sulfide solid electrolytes including sulfur as a main component and oxide solid electrolytes including a metal oxide as a main component are known. However, sulfide solid electrolytes might generate toxic hydrogen sulfide when reacting with moisture. Oxide solid electrolytes have a low ionic conductivity. For these reasons, the development of a novel solid electrolyte material having an excellent ionic conductivity is desired.

As a novel solid electrolyte material, an oxyhalide solid electrolyte material including a lithium element, a tantalum element, an oxygen element, and at least one halogen element is anticipated, for example. The oxyhalide solid electrolyte refers to a solid electrolyte including an oxygen element and a halogen element.

For the practical use of an all-solid-state secondary battery using a solid electrolyte material, a technique is required for preparing a fluid composition including a solid electrolyte material and applying the composition to the surface of an electrode or a current collector thus to form a solid electrolyte member.

To prepare a fluid composition, a solid electrolyte material needs to be mixed with an organic solvent. For this reason, the present inventors studied the resistance of an oxyhalide solid electrolyte material to various organic solvents. Consequently, it was found that the lithium ion conductivity of an oxyhalide solid electrolyte material decreases in some cases when the oxyhalide solid electrolyte material was mixed with a specific organic solvent. For example, even an organic solvent that is usable for sulfide solid electrolytes is not usable for oxyhalide solid electrolyte materials in some cases. From the above viewpoint, the structure of the present disclosure was achieved.

Embodiment 1

A solid electrolyte composition according to Embodiment 1 includes a solid electrolyte material including an oxygen element and a halogen element, and an organic solvent.

The solid electrolyte composition may be in the form of paste, or may be in the form of dispersion. The solid electrolyte material may for example be in the form of particles. In the solid electrolyte composition, the particles of the solid electrolyte material are mixed with the organic solvent. The viscosity of the solid electrolyte composition can be appropriately adjusted. For example, in the case where coating is performed by a method such as a spray method, the viscosity of the solid electrolyte composition is relatively low. In the case where coating is performed by a method such as a doctor blade method, the viscosity of the solid electrolyte composition is relatively high.

The ratio of the weight of the solid electrolyte material to the total of the weight of the solid electrolyte material and the weight of the organic solvent is not particularly limited, and may be 70 weight % or less. With such a structure, it is possible to obtain a solid electrolyte composition that can be easily applied to the surface of an electrode or a current collector.

The organic solvent includes at least one selected from the group consisting of a halogen-group-containing compound and a hydrocarbon. These organic solvents for example have a desired polarity, and thus can have an appropriate interaction with the solid electrolyte material. Consequently, even when dispersed in these organic solvents, the solid electrolyte material is likely to maintain its structure stable. This allows to obtain a solid electrolyte material in which a decrease in ionic conductivity can be suppressed.

The hydrocarbon is a compound consisting of carbon and hydrogen. The hydrocarbon may be an aliphatic hydrocarbon. The hydrocarbon may be a saturated hydrocarbon, or may be an unsaturated hydrocarbon. The hydrocarbon may be linear, or may be branched. The number of carbons included in the hydrocarbon is not particularly limited, and may be seven or more. Using the hydrocarbon allows to obtain a solid electrolyte composition with an excellent suspension stability of a solid electrolyte material.

The hydrocarbon may have a cyclic structure. The hydrocarbon may have an aromatic ring. The cyclic structure may be an alicyclic hydrocarbon, or may be an aromatic hydrocarbon. The cyclic structure may be monocyclic, or may be polycyclic. Since the hydrocarbon has the cyclic structure, the oxyhalide solid electrolyte material can be easily dispersed in an organic solvent. From the viewpoint of enhancing the suspension stability of the oxyhalide solid electrolyte material of the solid electrolyte composition, the hydrocarbon may include an aromatic hydrocarbon. The hydrocarbon may be an aromatic hydrocarbon.

The halogen-group-containing compound may consist of carbon and hydrogen in a portion other than the halogen group. In other words, the halogen-group-containing compound may be a compound in which at least one of hydrogen atoms included in a hydrocarbon is substituted with a halogen group. Examples of the halogen group include F, Cl, Br, and I. As the halogen group, at least one or at least two selected from the group consisting of F, Cl, Br, and I may be used. From the viewpoint of boiling point or drying properties, the halogen group may be a chloro group. The halogen-group-containing compound can have a high polarity. Using the halogen-group-containing compound allows to easily disperse the oxyhalide solid electrolyte material of the solid electrolyte composition. This allows to obtain a solid electrolyte composition with an excellent suspension stability of a solid electrolyte material. Consequently, the solid electrolyte composition can form a solid electrolyte member that has an excellent lithium ion conductivity and is denser.

The number of carbons included in the halogen-group-containing compound is not particularly limited, and may be seven or more. This makes the halogen-group-containing compound to be less likely to volatilize, thereby stably manufacturing a solid electrolyte composition. In addition, the halogen-group-containing compound can have a large molecular weight. In other words, the halogen-group-containing compound can have a high boiling point.

The halogen-group-containing compound may have a cyclic structure. The halogen-group-containing compound may have an aromatic ring. The cyclic structure may be an alicyclic hydrocarbon, or may be an aromatic hydrocarbon. The cyclic structure may be monocyclic, or may be polycyclic. Since the halogen-group-containing compound has the cyclic structure, the oxyhalide solid electrolyte material can be easily dispersed in the halogen-group-containing compound. The halogen-group-containing compound may include an aromatic hydrocarbon. The halogen-group-containing compound may be an aromatic compound.

The halogen-group-containing compound may contain only a halogen group as a functional group. In this case, the number of halogens included in the halogen-group-containing compound is not particularly limited. As the halogen, at least one or at least two selected from the group consisting of F, Cl, Br, and I may be used. Using such a compound allows to easily disperse the oxyhalide solid electrolyte material of the solid electrolyte composition. This allows to obtain a solid electrolyte composition with an excellent suspension stability of a solid electrolyte material. Consequently, the solid electrolyte composition can form a solid electrolyte member that has an excellent lithium ion conductivity and is denser. Using such a compound allows the solid electrolyte composition to easily form for example a dense solid electrolyte membrane having reduced pinholes, irregularities, and the like.

As described above, the halogen-group-containing compound may be a compound in which at least one of hydrogen atoms included in a hydrocarbon is substituted with a halogen group. In other words, the halogen-group-containing compound may be a halogenated hydrocarbon. The halogen-group-containing compound may be a compound in which all hydrogen atoms included in a hydrocarbon are substituted with halogen atoms. Using a halogenated hydrocarbon allows to easily disperse the oxyhalide solid electrolyte material of the solid electrolyte composition. This allows to obtain a solid electrolyte composition with an excellent suspension stability of a solid electrolyte composition. Consequently, the solid electrolyte composition can form a solid electrolyte member that has an excellent lithium ion conductivity and is denser. Using the halogenated hydrocarbon allows the solid electrolyte composition to easily form for example a dense solid electrolyte membrane having reduced pinholes, irregularities, and the like.

More specifically, the organic solvent may include at least one selected from the group consisting of tetralin, ethylbenzene, mesitylene, pseudocumene, xylene, cumene, 1,2,4-trichlorobenzene, chlorobenzene, 2,4-dichlorobenzene, o-chlorotoluene, 1,3-dichlorobenzene, p-chlorotoluene, 1,2-dichlorobenzene, 1,4-dichlorobutane, 2,4-dichlorotoluene, and 3,4-dichlorotoluene. With such a structure, the solid electrolyte material including an oxygen element and a halogen element can be easily dispersed in the organic solvent. With such a structure, the oxyhalide solid electrolyte material can be easily dispersed in the organic solvent.

More specifically, the organic solvent may include at least one selected from the group consisting of tetralin, mesitylene, xylene, cumene, o-chlorotoluene, p-chlorotoluene, 1,4-dichlorobutane, 2,4-dichlorotoluene, and 3,4-dichlorotoluene. With such a structure, the solid electrolyte material including an oxygen element and a halogen element can be easily dispersed in the organic solvent. With such a structure, the oxyhalide solid electrolyte material can be easily dispersed in the organic solvent.

The organic solvent can include at least one selected from the group consisting of a halogen-group-containing compound and a hydrocarbon. The number of halogen groups included in a molecule of the organic solvent is not particularly limited. The number of halogen groups included in a molecule of the organic solvent may be one. The boiling point of the organic solvent is not particularly limited, and may be 100° C. or more and 250° C. or less. The organic solvent may be liquid at ordinary temperature (25° C.). Such an organic solvent is less likely to volatilize at ordinary temperature, thereby stably manufacturing a solid electrolyte composition. Accordingly, it is possible to obtain a solid electrolyte composition that can be easily applied to the surface of an electrode or a current collector. In addition, this allows the organic solvent to be easily removed by drying. The organic solvent may be a liquid in which an oxyhalide solid electrolyte material can be dispersed, and the oxyhalide solid electrolyte material does not need to be completely dissolved in the organic solvent.

The organic solvent may for example be free of a heteroatom. With such a structure, the oxyhalide solid electrolyte material can be easily dispersed in the organic solvent. Examples of the heteroatom include N, O, P, and S.

The value of polar term $\delta p$ of Hansen solubility parameter (HSP) of the organic solvent is not limited to specific values. HSP is a parameter representing the solubility properties between substances. In the present disclosure, HSP refers to a parameter of a vector quantity obtained by decomposing the Hildebrand solubility parameter into three cohesive energy components including the London dispersion force, the dipole-dipole force, and the hydrogen-bonding force. In the present disclosure, a component corresponding to the dipole-dipole force of HSP is referred to as polar term δp. The unit of δp is for example Mpa$^{1/2}$. The values of HSP of organic solvents are available for example with reference to the database. In the case of an organic solvent for which the values of HSP are not registered in the database, the values of HSP can be calculated from the chemical structure of the organic solvent by using computer software such as Hansen Solubility Parameters in Practice (HSPiP).

The value of polar term δp of HSP of the organic solvent is for example 0 MPa$^{1/2}$ or more and 12.0 MPa$^{1/2}$ or less. This allows the oxyhalide solid electrolyte material of the solid electrolyte composition to be easily dispersed. In the case where the organic solvent includes a halogen-group-containing compound, the value of polar term δp of HSP with respect to the organic solvent may be 3.0 MPa$^{1/2}$ or more and 11.0 MPa$^{1/2}$ or less, or 4.0 MPa$^{1/2}$ or more and 10.0 MPa$^{1/2}$ or less. In the case where the organic solvent includes a hydrocarbon, the value of polar term δp of HSP with respect to the organic solvent may be 0 MPa$^{1/2}$ or more and 3.0 MPa$^{1/2}$ or less, or 0.5 MPa$^{1/2}$ or more and 2.5 MPa$^{1/2}$ or less.

With the above structure, the solid electrolyte composition can suppress a decrease in ionic conductivity. In other words, in the case where the solid electrolyte composition which includes: a solid electrolyte material including an oxygen element and a halogen element; and an organic solvent is dried to remove the organic solvent, a solid electrolyte member having a high ionic conductivity can be obtained. The solid electrolyte member can be a solid electrolyte membrane.

The oxyhalide solid electrolyte material for example can have lithium ion conductivity.

The oxyhalide solid electrolyte material includes at least one selected from the group consisting of Zn, Sn, Al, Sc, Ga, Bi, Sb, Zr, Hf, Ti, Ta, Nb, W, Y, Gd, Tb, and Sm. In the oxyhalide solid electrolyte material, these elements may be present in a state having a valence other than two. In the oxyhalide solid electrolyte material, these elements may be present in a state having a valence greater than two.

The oxyhalide solid electrolyte material may further include at least one selected from the group consisting of F, Cl, Br, and I.

With the above structure, the solid electrolyte composition can further suppress a decrease in lithium ion conductivity. This allows to manufacture a solid electrolyte member having a higher lithium ion conductivity.

The oxyhalide solid electrolyte material may include Li, O, at least one selected from the group consisting of Ta and Nb, and at least one selected from the group consisting of F, Cl, Br, and I.

With the above structure, the solid electrolyte composition can more reliably suppress a decrease in lithium ion conductivity. This allows to manufacture a solid electrolyte member having a higher lithium ion conductivity.

More specifically, the oxyhalide solid electrolyte material may include at least one selected from the group consisting of a material including Li, Ta, O, and Cl, a material including Li, Nb, O, and Cl, and a material including Li, Ta, Nb, O, and Cl. The oxyhalide solid electrolyte material may be a material including Li, Ta, O, and Cl, a material including Li, Nb, O, and Cl, or a material including Li, Ta, Nb, O, and Cl.

The oxyhalide solid electrolyte material may be a metal oxyhalide compound. The metal oxyhalide compound for example includes Li, M, O, and X.

Here, M for example includes at least one selected from the group consisting of Nb and Ta. Also, X is at least one selected from the group consisting of Cl, Br, and I.

The metal oxyhalide compound for example includes Li, M, O, and Cl. In the oxyhalide solid electrolyte material, the ratio of the number of moles of O to the number of moles of Cl, that is, O/Cl, may be 0.16 or more and 0.35 or less. In the oxyhalide solid electrolyte material, the ratio of the number of moles of Li to the number of moles of M, that is, Li/M, may be 0.6 or more and 2.4 or less. With such a structure, the solid electrolyte composition can further suppress a decrease in lithium ion conductivity. This allows to manufacture a solid electrolyte member having a higher lithium ion conductivity.

M may be Ta and Nb. In the metal oxyhalide compound, the ratio of the number of moles of O to the number of moles of Cl, that is, O/Cl, may be 0.16 or more and 0.35 or less. In the metal oxyhalide compound, the ratio of the number of moles of Li to the sum of the number of moles of Ta and the number of moles of Nb, that is, Li/(Ta+Nb), may be 0.6 or more and 2.4 or less. With such a structure, the solid electrolyte composition can further suppress a decrease in lithium ion conductivity. This allows to manufacture a solid electrolyte member having a higher lithium ion conductivity.

The metal oxyhalide compound may be represented by the following composition formula (A). In the composition formula (A), a may satisfy 0.1<a<7.0, and b may satisfy 0.4<b<1.9. The metal oxyhalide compound represented by the composition formula (A) has a high ionic conductivity. Using the metal oxyhalide compound as a solid electrolyte material allows an all-solid-state battery to exhibit an excellent charge and discharge efficiency.

$$Li_aMO_bX_{5+a-2b} \tag{A}$$

Examples of the metal oxyhalide compound represented by the composition formula (A) include LiTaOCl$_4$, LiNbOCl$_4$, and LiTa$_{0.9}$Nb$_{0.1}$OCl$_4$. The solid electrolyte material may include at least one selected from the group consisting of LiTaOCl$_4$, LiNbOCl$_4$, and LiTa$_{0.9}$Nb$_{0.1}$OCl$_4$. The solid electrolyte material may be LiTaOCl$_4$, LiNbOCl$_4$, or LiTa$_{0.9}$Nb$_{0.1}$OCl$_4$. These metal oxyhalide compounds have a high ionic conductivity. Using the metal oxyhalide compound as a solid electrolyte material allows an all-solid-state battery to exhibit an excellent charge and discharge efficiency.

The oxyhalide solid electrolyte material may be substantially free of a sulfur element. The phrase "substantially free" means, in the oxyhalide solid electrolyte material, for example, that the ratio of the number of moles of S to the number of moles of O, that is, S/O, is 0 or more and 0.01 or less, or that the content of sulfur included in the oxyhalide solid electrolyte material is 1 mol % or less. This allows to provide an oxyhalide solid electrolyte material in which a decrease in ionic conductivity is more reliably suppressed. The oxyhalide solid electrolyte material may be free of a sulfur element.

The oxyhalide solid electrolyte material may include a crystalline material, and may include an amorphous material. The oxyhalide solid electrolyte material may be at least partially amorphous. The term "amorphous material" is not limited to a material having no crystal structure at all, and includes even a material having a crystalline region within a short-range order. An amorphous material for example refers to a material that does not exhibit a sharp peak derived from a crystal and exhibits a broad peak derived from a noncrystalline material in X-ray diffraction (XRD).

Embodiment 2

Figure 3:
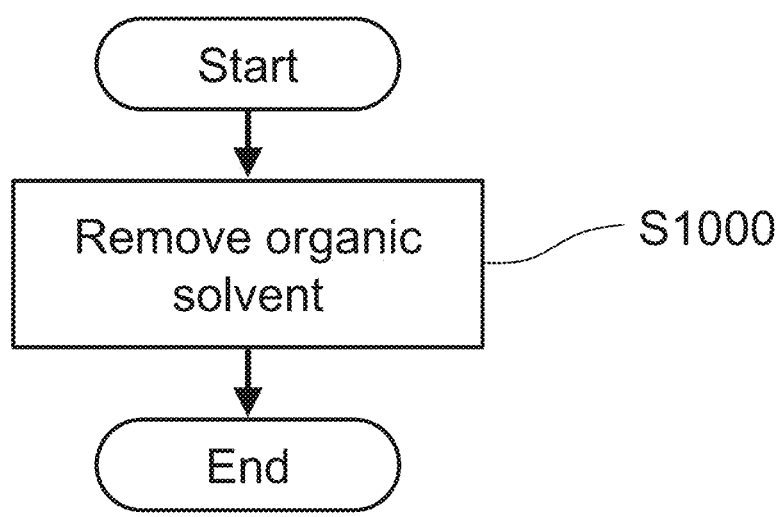
FIG. 3 is a flowchart showing an exemplary method for manufacturing a solid electrolyte member.

Embodiment 2 will be described below. The same description as that of the above Embodiment 1 will be omitted appropriately. FIG. 3 is a flowchart showing an exemplary method for manufacturing a solid electrolyte member.

The method for manufacturing a solid electrolyte member includes Step S1000 of removing the organic solvent from the solid electrolyte composition according to the above Embodiment 1. The solid electrolyte member is a member including an oxyhalide solid electrolyte material. The solid electrolyte member may for example be a member such as a solid electrolyte layer or a solid electrolyte membrane including an oxyhalide solid electrolyte material, or an electrode layer including an oxyhalide solid electrolyte material.

By removing, from a solid electrolyte composition including an oxyhalide solid electrolyte material and an organic solvent, the organic solvent, it is possible for example to manufacture a homogeneous solid electrolyte membrane. Consequently, the solid electrolyte member can have a high lithium ion conductivity.

Before removing the organic solvent from the solid electrolyte composition, the solid electrolyte composition may be applied to a substrate to form a membrane of the solid electrolyte composition. By removing the organic solvent from the membrane of the solid electrolyte, it is possible for example to manufacture a homogeneous solid electrolyte membrane. The substrate is not particularly limited. Examples of the substrate include an electrode and a current collector.

In Step S1000, the organic solvent is removed from the solid electrolyte composition. At this time, the organic solvent may be removed by drying under reduced pressure. The solid electrolyte composition before removal of the organic solvent is fluid and accordingly excellent in formability, and thus can form, for example, a coating film having a uniform thickness. Drying such a coating film allows to easily obtain, for example, a dense solid electrolyte membrane having reduced pinholes, irregularities, and the like.

Drying under reduced pressure indicates removal of an organic solvent from a solid electrolyte composition in an atmosphere of a pressure lower than atmospheric pressure. The atmosphere of a pressure lower than atmospheric pressure may for example be −0.01 MPa or less as a gauge pressure. In drying under reduced pressure, the solid electrolyte composition or the solid electrolyte member may be heated to, for example, 50° C. or more and 250° C. or less. The organic solvent may be removed by vacuum drying. Vacuum drying indicates removal of an organic solvent from a solid electrolyte composition for example at a vapor pressure or lower at a temperature 20° C. lower than the boiling point of the organic solvent. The removal of the organic solvent can be confirmed by, for example, Fourier transform infrared spectroscopy (FT-IR), X-ray photoelectron spectroscopy (XPS), gas chromatography (GC), or gas chromatography-mass spectrometry (GC/MS). Note that the solid electrolyte material after drying only needs to have ionic conductivity, and the organic solvent does not need to be completely removed.

EXAMPLES

The details of the present disclosure will be described below using examples and comparative examples.

(Preparation of Solid Electrolyte Composition)

An amount of 200 mg of $LiTaOCl_4$ (hereinafter referred to as LTOC), $LiNbOCl_4$ (hereinafter referred to as LNOC), or $LiTa_{0.9}Nb_{0.1}OCl_4$ (hereinafter referred to as LTNOC) was weighed and put into a commercial screw-cap glass vial, as a solid electrolyte. An amount of 100 mg of an organic solvent was weighed and added into the screw-cap vial for stirring and mixing with a spatula thus to prepare a solid electrolyte composition according to each of the examples.

An amount of 150 mg of $Li_2S$—$P_2S_5$ (hereinafter referred to as LPS) was weighed and put into another commercial screw-cap glass vial, as a solid electrolyte. An amount of 150 mg of an organic solvent was weighted and added into the screw-cap vial for stirring and mixing with a spatula thus to prepare a solid electrolyte composition according to part of the comparative examples.

(Removal of Organic Solvent by Drying)

The organic solvent was removed from the solid electrolyte composition by vacuum drying thus to obtain a solid electrolyte member. The solid electrolyte composition was vacuum-dried at 100° C. for 1 hour in an atmosphere of a pressure equal to or lower than a vapor pressure at a temperature 20° C. lower than the boiling point of the organic solvent included in the solid electrolyte composition. Visual check was performed on whether the organic solvent has been removed. In the case where visual check determined that the powder of the solid electrolyte material was obtained, this case was determined as "succeeded in drying". In the case where visual check determined that the solid electrolyte composition was in the form of liquid, this case was determined as "failed in drying". In the case of "failed in drying", the lithium ion conductivity was not measured.

(Measurement of Lithium Ion Conductivity)

FIG. 1 is a diagram for describing a method for evaluating the lithium ion conductivity of a solid electrolyte material. As shown in FIG. 1, a pressure molding die 200 includes a frame 201, an upper punch 203, and a lower punch 202. The frame 201 is made of an electronically insulating polycarbonate. The upper punch 203 and the lower punch 202 are made of stainless steel.

The ionic conductivity was evaluated using the pressure molding die 200 shown in FIG. 1 by the following method.

In a dry atmosphere having a dew point of −50° C. or less, a powder 100 of a solid electrolyte material was loaded in the pressure molding die 200, and was uniaxially pressed at 300 MPa thus to produce a conductivity measurement cell of the powder of the solid electrolyte material.

Under the pressurized state, respective leads were taken from the upper punch 203 and the lower punch 202. The leads were connected to a potentiostat (EC-Lab by Bio-Logic) equipped with a frequency response analyzer. The lithium ion conductivity at 25° C. was measured by electrochemical impedance spectroscopy.

Example 1

The organic solvent used was tetralin. Three types of solid electrolyte compositions were prepared using LTOC, LNOC, or LTNOC as the solid electrolyte material by the above-described method. Further, tetralin as the organic solvent was removed by the above-described vacuum drying thus to obtain three types of solid electrolyte members.

The lithium ion conductivity of the obtained solid electrolyte members was measured by the above-described method. The results are shown in Table 1.

Reference Example

Four types of solid electrolyte members were obtained by the same method as in Example 1, except that no organic solvents were used and that LTOC, LNOC, LTNOC, or LPS was used as the solid electrolyte material.

Example 2

A solid electrolyte member was obtained by the same method as in Example 1, except that mesitylene was used as the organic solvent and that LTOC was used as the solid electrolyte material.

Example 3

Three types of solid electrolyte members were obtained by the same method as in Example 1, except that xylene was used as the organic solvent.

Example 4

Three types of solid electrolyte members were obtained by the same method as in Example 1, except that cumene was used as the organic solvent.

Example 5

A solid electrolyte member was obtained by the same method as in Example 1, except that 2,4-dichlorotoluene was used as the organic solvent and that LTOC was used as the solid electrolyte material.

Example 6

A solid electrolyte member was obtained by the same method as in Example 1, except that o-chlorotoluene was used as the organic solvent and that LTOC was used as the solid electrolyte material.

Example 7

Three types of solid electrolyte members were obtained by the same method as in Example 1, except that p-chlorotoluene was used as the organic solvent.

Example 8

A solid electrolyte member was obtained by the same method as in Example 1, except that 1,4-dichlorobutane was used as the organic solvent and that LTOC was used as the solid electrolyte material.

Example 9

Three types of solid electrolyte members were obtained by the same method as in Example 1, except that 3,4-dichlorotoluene was used as the organic solvent.

Comparative Example 1

A solid electrolyte member was obtained by the same method as in Example 1, except that LPS was used as the solid electrolyte material.

Comparative Example 2

A solid electrolyte member was obtained by the same method as in Example 1, except that mesitylene was used as the organic solvent and that LPS was used as the solid electrolyte material.

Comparative Example 3

A solid electrolyte member was obtained by the same method as in Example 1, except that xylene was used as the organic solvent and that LPS was used as the solid electrolyte material.

Comparative Example 4

A solid electrolyte member was obtained by the same method as in Example 1, except that cumene was used as the organic solvent and that LPS was used as the solid electrolyte material.

Comparative Example 5

A solid electrolyte member was obtained by the same method as in Example 1, except that o-chlorotoluene was used as the organic solvent and that LPS was used as the solid electrolyte material.

Comparative Example 6

A solid electrolyte member was obtained by the same method as in Example 1, except that p-chlorotoluene was used as the organic solvent and that LPS was used as the solid electrolyte material.

Comparative Example 7

A solid electrolyte member was obtained by the same method as in Example 1, except that 1,4-dichlorobutane was used as the organic solvent and that LPS was used as the solid electrolyte material.

Comparative Example 8

Two types of solid electrolyte members were obtained by the same method as in Example 1, except that dibutyl ether was used as the organic solvent and that LTOC or LPS was used as the solid electrolyte material.

Comparative Example 9

Two types of solid electrolyte members were obtained by the same method as in Example 1, except that anisole was used as the organic solvent and that LTOC or LPS was used as the solid electrolyte material.

Comparative Example 10

Two types of solid electrolyte members were obtained by the same method as in Example 1, except that tetraethyl orthosilicate was used as the organic solvent and that LTOC or LPS was used as the solid electrolyte material.

Comparative Example 11

Three types of solid electrolyte members were obtained by the same method as in Example 1, except that butyl acetate was used as the organic solvent and that LTOC, LNOC, or LPS was used as the solid electrolyte material.

Comparative Example 12

Two types of solid electrolyte members were obtained by the same method as in Example 1, except that diisobutyl ketone was used as the organic solvent and that LTOC or LPS was used as the solid electrolyte material.

Comparative Example 13

Two types of solid electrolyte members were obtained by the same method as in Example 1, except that N,N-dimethylaniline was used as the organic solvent and that LTOC or LPS was used as the solid electrolyte material.

Comparative Example 14

Two types of solid electrolyte members were obtained by the same method as in Example 1, except that N-methylaniline was used as the organic solvent and that LTOC or LPS was used as the solid electrolyte material.

Comparative Example 15

Two types of solid electrolyte members were obtained by the same method as in Example 1, except that 2-ethyl-1-hexanol was used as the organic solvent and that LTOC or LPS was used as the solid electrolyte material.

Tables 1 to 3 show the measurement results of the lithium ion conductivities of the solid electrolyte members each formed from a solid electrolyte composition including an organic solvent and a solid electrolyte material. LTOC, LNOC, and LTNOC were used as the oxyhalide solid electrolyte materials. LPS was used as the sulfide solid electrolyte material. Tables 1 to 3 show compound names of organic solvents included in the respective solid electrolyte compositions, polar terms δp of Hansen solubility parameter for the organic solvents, skeletal structures of the organic solvents, functional groups of the organic solvents, and boiling points of organic solvents. Tables 1 to 3 further show the lithium ion conductivities of LTOC, LNOC, LTNOC, and LPS.

TABLE 1

| | Organic solvent | δp (MPa$^{1/2}$) | Skeletal structure | Functional group | Boiling point (° C.) | Conductivity (S/cm) | | |
| --- | --- | --- | --- | --- | --- | --- | --- | --- |
| | | | | | | LTOC | LNOC | LTNOC |
| Example 1 | Tetralin | 2.0 | Aromatic | — | 208 | $4.1 \times 10^{-3}$ | $6.4 \times 10^{-3}$ | $5.1 \times 10^{-3}$ |
| Example 2 | Mesitylene | 0.6 | Aromatic | — | 165 | $4.4 \times 10^{-3}$ | — | — |
| Example 3 | Xylene | 1.0 | Aromatic | — | 140 | $4.9 \times 10^{-3}$ | $7.2 \times 10^{-3}$ | $5.8 \times 10^{-3}$ |
| Example 4 | Cumene | 1.2 | Aromatic | — | 152 | $6.1 \times 10^{-3}$ | $7.7 \times 10^{-3}$ | $6.2 \times 10^{-3}$ |
| Example 5 | 2,4-Dichlorotoluene | 4.3 | Aromatic | Chloro group | 200 | $5.8 \times 10^{-3}$ | — | — |
| Example 6 | o-Chlorotoluene | 4.9 | Aromatic | Chloro group | 159 | $4.9 \times 10^{-3}$ | — | — |
| Example 7 | p-Chlorotoluene | 6.2 | Aromatic | Chloro group | 163 | $5.2 \times 10^{-3}$ | $7.5 \times 10^{-3}$ | $7.1 \times 10^{-3}$ |
| Example 8 | 1,4-Dichlorobutane | 7.7 | Non-aromatic | Chloro group | 155 | $4.1 \times 10^{-3}$ | — | — |
| Example 9 | Dichlorotoluene | 9.8 | Aromatic | Chloro group | 205 | $4.5 \times 10^{-3}$ | $8.0 \times 10^{-3}$ | $6.4 \times 10^{-3}$ |

TABLE 2

| | Organic solvent | δp (MPa$^{1/2}$) | Skeletal structure | Functional group | Boiling point (° C.) | Conductivity (S/cm) LPS |
| --- | --- | --- | --- | --- | --- | --- |
| Comparative Example 1 | Tetralin | 2.0 | Aromatic | — | 208 | $7.8 \times 10^{-4}$ |
| Comparative Example 2 | Mesitylene | 0.6 | Aromatic | — | 165 | $7.9 \times 10^{-4}$ |
| Comparative Example 3 | Xylene | 1.0 | Aromatic | — | 140 | $7.9 \times 10^{-4}$ |
| Comparative Example 4 | Cumene | 1.2 | Aromatic | — | 152 | $7.4 \times 10^{-4}$ |
| Comparative Example 5 | o-Chlorotoluene | 4.9 | Aromatic | Chloro group | 159 | $7.9 \times 10^{-4}$ |
| Comparative Example 6 | p-Chlorotoluene | 6.2 | Aromatic | Chloro group | 163 | $7.7 \times 10^{-4}$ |
| Comparative Example 7 | 1,4-Dichlorobutane | 7.7 | Non-aromatic | Chloro group | 155 | $7.6 \times 10^{-4}$ |

TABLE 3

| | Organic solvent | δp (MPa$^{1/2}$) | Skeletal structure | Functional group | Boiling point (° C.) | Conductivity (S/cm) LTOC | LNOC | LTNOC | LPS |
|---|---|---|---|---|---|---|---|---|---|
| Comparative Example 8 | Dibutyl ether | 3.4 | Non-aromatic | Ether group | 141 | $6.5 \times 10^{-5}$ | — | — | $8.0 \times 10^{-4}$ |
| Comparative Example 9 | Anisole | 4.4 | Aromatic | Ether group | 154 | $4.0 \times 10^{-4}$ | — | — | $8.0 \times 10^{-4}$ |
| Comparative Example 10 | Tetraethyl orthosilicate | 4.3 | Silicic acid compound | Si-O-C group | 166 | $2.0 \times 10^{-7}$ | — | — | $7.9 \times 10^{-4}$ |
| Comparative Example 11 | Butyl acetate | 3.7 | Non-aromatic | Ester group (Carbonyl group) | 126 | Drying failure | Drying failure | — | $8.2 \times 10^{-4}$ |
| Comparative Example 12 | Diisobutyl ketone | 3.7 | Non-aromatic | Ketone group (Carbonyl group) | 168 | $1.3 \times 10^{-6}$ | — | — | $7.2 \times 10^{-4}$ |
| Comparative Example 13 | N,N-Dimethylaniline | 3.2 | Aromatic | Amino group | 194 | Drying failure | — | — | $7.7 \times 10^{-4}$ |
| Comparative Example 14 | N-Methylaniline | 6.0 | Aromatic | Amino group | 196 | Drying failure | — | — | $7.9 \times 10^{-4}$ |
| Comparative Example 15 | 2-Ethyl-1-hexanol | 3.3 | Non-aromatic | Hydroxy group | 185 | Drying failure | — | — | $7.9 \times 10^{-4}$ |
| Reference Example | No immersion in solvent | — | — | — | — | $7.8 \times 10^{-3}$ | $8.0 \times 10^{-3}$ | $8.5 \times 10^{-3}$ | $8.0 \times 10^{-4}$ |

The solid electrolyte members according to the examples exhibited a high lithium ion conductivity. The lithium ion conductivities of the solid electrolyte members according to the examples were nearly equal to the lithium ion conductivity of the solid electrolyte member according to the reference example. Using the organic solvents ac cording to the examples suppressed the decrease in lithium ion conductivity in production of the solid electrolyte member from the solid electrolyte composition.

In the cases where LTOC was used as the oxyhalide solid electrolyte material, the lithium ion conductivity of the solid electrolyte members ac cording to Comparative Examples 8 to 10 and 12 was lower than the lithium ion conductivity of the solid electrolyte member according to the reference example. Accordingly, using the organic solvents according to Comparative Examples 8 to 10 and 12 did not suppress the decrease in lithium ion conductivity of the solid electrolyte members. This is considered to be because the organic solvents according to Comparative Examples 8 to 10 and 12 were adsorbed by the solid electrolyte materials.

In the case where butyl acetate, N,N-dimethylaniline, N-methylaniline, or 2-ethyl-1-hexanol was used as the organic solvent, the organic solvent could not be removed in preparation of the solid electrolyte member including the oxyhalide solid electrolyte material. It is considered that, by using a compound containing a functional group other than a halogen group in the organic solvent, the solid electrolyte material reacted with the compound containing the functional group other than a halogen group.

Figure 2:
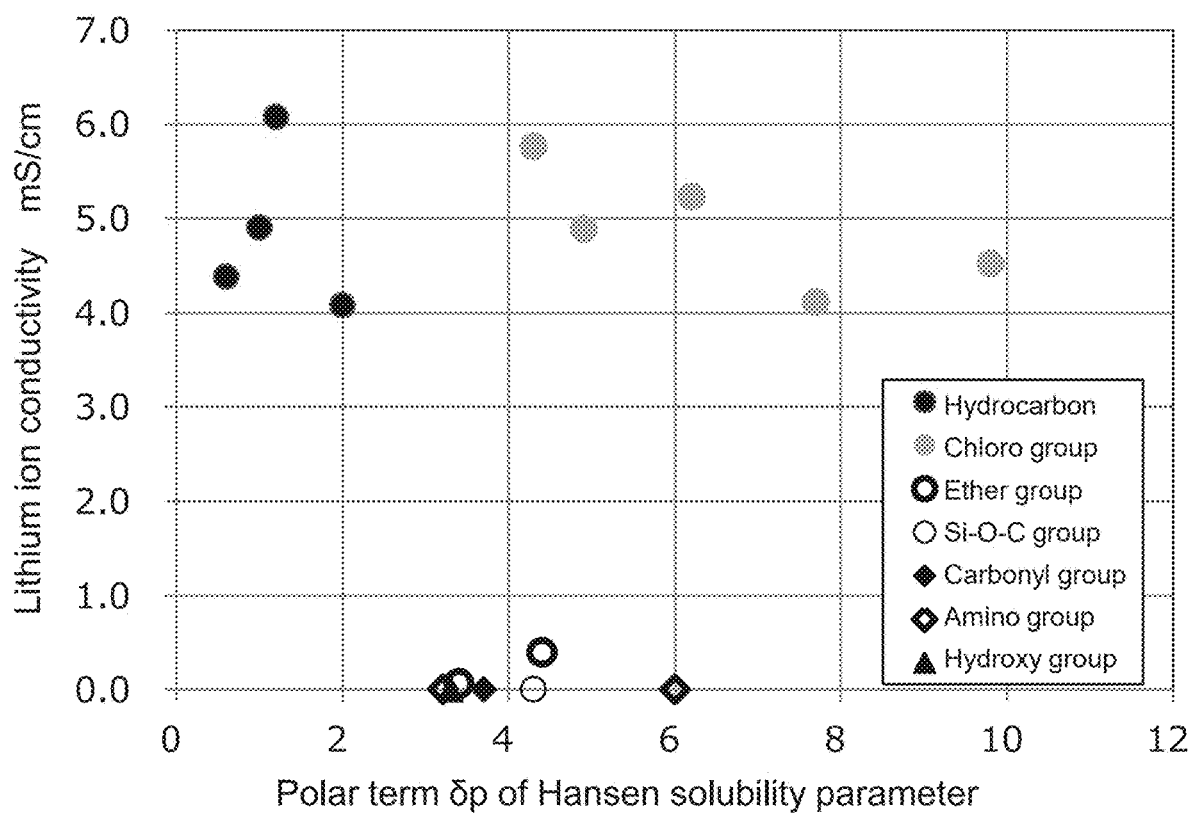
FIG. 2 is a graph showing the relationship between polar term of Hansen solubility parameter for each organic solvent and lithium ion conductivity of LTOC after vacuum drying.

FIG. 2 is a graph showing the relationship between the value of polar term of Hansen solubility parameter for each organic solvent and the lithium ion conductivity of LTOC after vacuum drying. The horizontal axis represents the value (Mpa$^{1/2}$) of polar term δp of Hansen solubility parameter for organic solvents. The vertical axis represents the lithium ion conductivity (mS/cm) of the LTOC after vacuum drying. In the comparative examples, the lithium ion conductivity of the sample from which the organic solvent could not be removed by vacuum drying was assumed to be 0 mS/cm.

According to FIG. 2, the lithium ion conductivity of LTOC after vacuum drying does not depend on the value of polar term of Hansen solubility parameter for organic solvents. On the other hand, the lithium ion conductivity of LTOC after vacuum drying depends on a functional group of an organic solvent. In the case where an organic solvent is hydrocarbon, or in the case where an organic solvent has a chloro group as a functional group, LTOC after drying has a high lithium ion conductivity. On the other hand, in the case where an organic solvent has an ether group, an Si—O—C group, a carbonyl group, an amino group, or a hydroxy group as a functional group, LTOC after vacuum drying has a low lithium ion conductivity. In other words, in the case where the functional group of the organic solvent includes a heteroatom, LTOC after vacuum drying has a low lithium ion conductivity. Examples of the heteroatom include N, O, P, and S. The detailed mechanism of action is unknown. However, when an organic solvent has a functional group that causes localization of electron density, an interaction such as solvation can occur between a site where the electron density is localized in the functional group and a constituent element of LTOC. This is considered to have caused the organic solvent to be strongly adsorbed by particle surfaces of LTOC and thus disrupted the structure of LTOC. It is presumed that the lithium ion conductivities of the solid electrolyte members according to the comparative examples consequently decreased. This is considered as the common trend among solid electrolyte materials including an oxygen element and a halogen element.

INDUSTRIAL APPLICABILITY

The solid electrolyte composition according to the present disclosure can be used, for example, for manufacturing all-solid-state lithium secondary batteries.

What is claimed is:
1. A solid electrolyte composition comprising:
a solid electrolyte material including an oxygen element and a halogen element; and
an organic solvent, wherein:
the organic solvent includes at least one selected from the group consisting of a halogen-group-containing compound and a hydrocarbon,
the solid electrolyte material includes at least one selected from the group consisting of a material including Li,

Ta, O, and Cl, a material including Li, Nb, O, and Cl, and a material including Li, Ta, Nb, O, and Cl, and a ratio of the number of moles of O to the number of moles of Cl is 0.16 or more and 0.35 or less, and a ratio of the number of moles of Li to the number of moles of M is 0.6 or more and 2.4 or less, M being at least one selected from the group consisting of Ta and Nb.

2. The solid electrolyte composition according to claim 1, wherein the solid electrolyte material has lithium ion conductivity.

3. The solid electrolyte composition according to claim 1, wherein the solid electrolyte material includes at least one selected from the group consisting of $LiTaOCl_4$, $LiNbOCl_4$, and $LiTa_{0.9}Nb_{0.1}OCl_4$.

4. The solid electrolyte composition according to claim 1, wherein the halogen-group-containing compound contains only a halogen group as a functional group.

5. The solid electrolyte composition according to claim 1, wherein the organic solvent has a cyclic structure.

6. The solid electrolyte composition according to claim 5, wherein the organic solvent includes an aromatic compound.

7. The solid electrolyte composition according to claim 1, wherein the organic solvent includes at least one selected from the group consisting of tetralin, ethylbenzene, mesitylene, pseudocumene, xylene, cumene, 1,2,4-trichlorobenzene, chlorobenzene, 2,4-dichlorobenzene, o-chlorotoluene, 1,3-dichlorobenzene, p-chlorotoluene, 1,2-dichlorobenzene, 1,4-dichlorobutane, 2,4-dichlorotoluene, and 3,4-dichlorotoluene.

8. The solid electrolyte composition according to claim 1, wherein the organic solvent includes at least one selected from the group consisting of tetralin, mesitylene, xylene, cumene, o-chlorotoluene, p-chlorotoluene, 1,4-dichlorobutane, 2,4-dichlorotoluene, and 3,4-dichlorotoluene.

9. The solid electrolyte composition according to claim 1, wherein the solid electrolyte material is substantially free of a sulfur element.

10. A method for manufacturing a solid electrolyte member, the method comprising removing the organic solvent from the solid electrolyte composition according to claim 1.

11. The method for manufacturing a solid electrolyte member according to claim 10, wherein the organic solvent is removed by drying under reduced pressure.

* * * * *